(12) United States Patent
Horiguchi et al.

(10) Patent No.: US 9,612,387 B2
(45) Date of Patent: Apr. 4, 2017

(54) LIGHT SOURCE DEVICE AND DISPLAY APPARATUS

(71) Applicant: Sakai Display Products Corporation, Sakai-shi, Osaka (JP)

(72) Inventors: Yuki Horiguchi, Sakai (JP); Yukihide Kohtoku, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/765,513

(22) PCT Filed: Aug. 25, 2014

(86) PCT No.: PCT/JP2014/072129
§ 371 (c)(1),
(2) Date: Aug. 3, 2015

(87) PCT Pub. No.: WO2016/030937
PCT Pub. Date: Mar. 3, 2016

(65) Prior Publication Data
US 2016/0266301 A1 Sep. 15, 2016

(51) Int. Cl.
*F21V 8/00* (2006.01)
(52) U.S. Cl.
CPC ......... *G02B 6/0045* (2013.01); *G02B 6/0055* (2013.01); *G02B 6/0065* (2013.01)
(58) Field of Classification Search
CPC ... G02B 6/0045; G02B 6/0055; G02B 6/0065
See application file for complete search history.

(56) References Cited

U.S. PATENT DOCUMENTS

| 8,602,581 B1* | 12/2013 | Kaihotsu | G02B 6/0031 362/97.1 |
| 2013/0050584 A1* | 2/2013 | Kaihotsu | G09G 3/3406 348/731 |
| 2014/0126237 A1 | 5/2014 | Morino et al. | |

FOREIGN PATENT DOCUMENTS

| JP | 2007-232809 A | 9/2007 |
| JP | 2014-093229 A | 5/2014 |
| WO | WO2011007410 A1 | 1/2011 |

* cited by examiner

*Primary Examiner* — Thomas M Sember
(74) *Attorney, Agent, or Firm* — Rudy J. Ng; Bret E. Field; Bozicevic, Field & Francis LLP

(57) ABSTRACT

A casing integrally includes a first accommodation part in which an optical part is accommodated and a second accommodation part in which an optical support is accommodated. Since the optical part which is a part of an optical plate member formed in a bent plate shape is supported by the optical support which is another part of the optical plate member, it is unnecessary to prepare a thick and robust member for supporting the optical part. That is, the first accommodation part side of a light source device can be made thinner. Moreover, the second accommodation part side of a display apparatus functions as a stand for stationary installation of the first accommodation part side of the light source device. It is therefore possible to reduce the size of the light source device and also the display apparatus, since it is not necessary to attach a separate stand to the first accommodation part side of the light source device.

12 Claims, 9 Drawing Sheets

FIG. 8
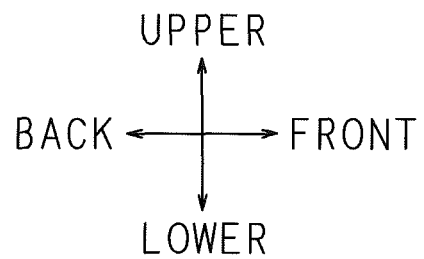
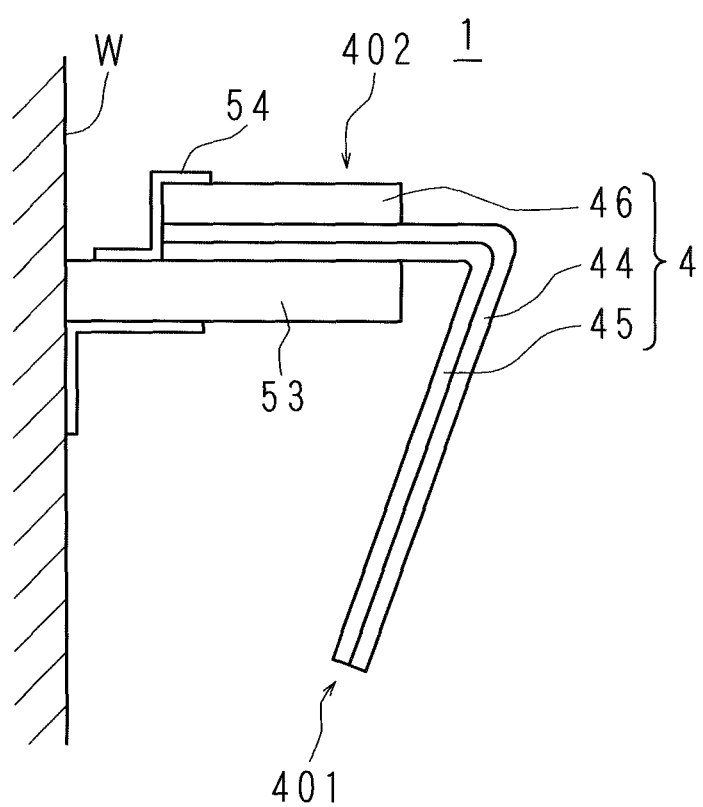

LIGHT SOURCE DEVICE AND DISPLAY APPARATUS

CROSS-REFERENCE TO RELATED APPLICATIONS

This application is the national phase under 35 U.S.C. §371 of PCT International Application No. PCT/JP2014/072129 which has an International filing date of Aug. 25, 2014 and designated the United States of America.

FIELD

The present invention relates to a light source device including a light source and a casing, and to a display apparatus.

BACKGROUND

A liquid-crystal display module includes a liquid-crystal display panel and a backlight unit (see Japanese Patent Application Laid-Open No. 2007-232809).

A case where the liquid-crystal display panel is arranged in a vertical posture is described below.

Conventionally, a backlight unit of an edge light type has been proposed. The backlight unit of the edge light type includes a light guide plate and a light source. The light guide plate is arranged in a vertical posture at the back side of the liquid-crystal display panel so as to be opposed to the liquid-crystal display panel. The light source is arranged to be opposed to the circumferential surface of the light guide plate.

The light emitted by the light source enters from the circumferential surface of the light guide plate into the light guide plate, and then is outputted from the front surface of the light guide plate to the front side of the light guide plate. As a result, the liquid-crystal display panel is illuminated from the back side.

SUMMARY

A stationary liquid-crystal display apparatus includes a liquid-crystal display module and a stand.

The stand has a leg and a support. The leg is placed on a floor, desk or the like. The support is vertically arranged to protrude from the leg, the tip end of the support being attached to the back side of the liquid-crystal display module.

That is, the liquid-crystal display module to which the support of the stand is attached has a substantially increased thickness even if the liquid-crystal display module itself is thin. This results in insufficient thinning (i.e. size reduction in the thickness direction) of the entire liquid-crystal display apparatus.

A wall-hanging or ceiling-suspended liquid-crystal display apparatus includes a liquid-crystal display module and a fixing member for fixing the liquid-crystal display module to a wall or a ceiling. Since the fixing member is also attached to the back side of the liquid-crystal display module, the thickness of the liquid-crystal display module is substantially increased.

The present invention has been made in view of the circumstances described above, and mainly aims to provide a light source device and a display apparatus that can attempt size reduction.

The light source device according to the present invention, comprising a light source and a casing in which the light source is accommodated, is characterized by further comprising an optical plate member having a shape of a bent plate and including an optical part formed in a plate shape with one surface outputting light emitted from the light source, and an optical support formed in a plate shape for supporting the optical part, the optical support being integrally connected with the optical part and being so arranged as to intersect with or to be opposed to the optical part, and is characterized in that the casing integrally includes: a first accommodation part having an opening and accommodating the optical part such that light outputted from the one surface is outputted to an outside through the opening; and a second accommodation part accommodating the optical support and being placed outside or attached to an external part.

The light source device according to the present invention is characterized in that the light source is accommodated in the second accommodation part so as to be opposed to the optical support, and the light source device further comprises: an optical sheet covering the one surface and being accommodated in the first accommodation part; and a reflection sheet covering at least both surfaces of the optical plate member, excluding the one surface and a light entering region which is to receive light emitted from the light source, and being accommodated in the casing.

The light source device according to the present invention is characterized in that the optical plate member is configured by using glass.

A display apparatus according to the present invention is characterized by comprising: the light source device according to the present invention; and a display panel illuminated from a back side by the light source device, and is characterized in that the display panel is accommodated in the first accommodation part such that a display region of the display panel is exposed to an outside through the opening.

The display apparatus according to the present invention is characterized by further comprising a circuit substrate for displaying an image on the display panel, the circuit substrate being located in the second accommodation part.

The display apparatus according to the present invention is characterized in that the display panel is attached to the optical part while being separated from the one surface of the optical part by an appropriate distance, and an optical sheet is placed between the display panel and the one surface.

In the light source device according to the present invention, the light source and the optical plate member are accommodated in the casing.

The optical plate member has the shape of a bent plate in which the optical part and the optical support are integrally connected together. The casing integrally includes the first accommodation part in which the optical part is accommodated and the second accommodation part in which the optical support is accommodated.

The optical part has a plate-like shape, and light emitted by the light source is outputted from the one surface of the optical part. The light outputted from the one surface of the optical part is outputted to the outside through the opening formed at the first accommodation part. That is, at the side of the first accommodation part of the light source device, illumination is possible similarly to the conventional light source device.

In the display apparatus according to the present invention, the light source, the optical plate member and the display panel are accommodated in the casing.

The optical plate member has the shape of a bent plate in which the optical part and the optical support are integrally connected together. The casing integrally includes the first accommodation part in which the optical part and the display panel are accommodated and the second accommodation part in which the optical support is accommodated.

The optical part has a plate-like shape, and light emitted by the light source is outputted from the one surface of the optical part. The display panel is illuminated from the back side with the light outputted from the one surface of the optical part. Since the display region of the display panel is exposed to the outside through the opening formed at the first accommodation part, the light passed through the display panel is outputted to the outside through the opening so as to display an image in the display region. That is, display similar to that in the conventional display apparatus is shown on the side of the first accommodation part of the display apparatus.

In the light source device and display apparatus as described above, the optical part corresponds to a plate-like optical member (light guide plate, diffusion plate or the like) included in the conventional light source device or display apparatus.

As the conventional optical member is larger and heavier than the other members constituting the light source device or display apparatus, a thick and robust frame, for example, is required for supporting the optical member.

On the other hand, the optical part is supported by the optical support. It is thus unnecessary to prepare a thick robust frame for supporting the optical part.

In the case of a stationary type, the second accommodation part is placed on a floor, a desk or the like. Here, the second accommodation part side of the light source device and display apparatus (i.e. the second accommodation part and components accommodated therein) functions as a stand for placing the first accommodation part side of the light source device and display apparatus (i.e. the first accommodation part and components accommodated therein; a part corresponding to the liquid-crystal display module described earlier) on a floor surface, a desk or the like.

In the case of a wall-hanging or ceiling-suspended type, the second accommodation part is attached to a wall, ceiling or the like. Here, the second accommodation part side of the light source device and the display apparatus functions as a fixing member for attaching the first accommodation part side of the light source device and the display apparatus to a wall or ceiling.

In the light source device and display apparatus according to the present invention, the light source is accommodated in the second accommodation part.

Therefore, compared to the case where a light source is accommodated in the first accommodation part, the first accommodation part side of the light source device and display apparatus is reduced in size and weight, while the center of gravity moves to the second accommodation part side of the light source device and display apparatus. Accordingly, the second accommodation part side of the light source device and display apparatus can stably support the first accommodation part side of the light source device and display apparatus.

Moreover, the optical sheet which is generally susceptible to thermal expansion is accommodated in the first accommodation part while the light source which is to be a heat source is accommodated in the second accommodation part, making it difficult for the heat generated by the light source to be transferred to the optical sheet. In other words, thermal expansion of the optical sheet can be suppressed.

Furthermore, in the case of the display apparatus, the display panel which in general easily causes a defect due to heat is accommodated in the first accommodation part, which makes it difficult for the heat generated by the light source to be transferred to the display panel. In other words, the occurrence of a defect due to heat in the display panel can be suppressed.

The light emitted by the light source passes through the optical member and is efficiently outputted from the one surface of the optical part. This is because the light leaking from the optical member is reflected to the inside of the optical member by the reflection sheet covering the optical member.

In the light source device and display apparatus according to the present invention, the optical plate member is made by using glass.

Though a general optical member is made with synthetic resin, glass generally has higher rigidity and higher resistance to heat compared to synthetic resin, which is suitable for material of the optical plate member.

It is noted, however, that glass generally has higher specific gravity compared to synthetic resin, which makes the optical part heavier than the optical member. This will, nevertheless, not cause a particular problem in terms of supporting of the optical part, since the optical part is supported by the optical support.

In the display apparatus according to the present invention, the circuit substrate is accommodated in the second accommodation part.

Therefore, compared to the case where the circuit substrate is accommodated in the first accommodation part, the first accommodation part side of the light source device and display apparatus is reduced in size and weight, while the center of gravity moves to the second accommodation part side of the light source device and display apparatus. Accordingly, the second accommodation part side of the light source device and display apparatus can stably support the first accommodation part side of the light source device and display apparatus.

According to the present invention, the display panel and the optical sheet are supported by the optical support together with the optical part.

It is thus unnecessary to prepare a thick and robust frame for supporting the display panel and optical sheet. Therefore, the first accommodation part side of the light source device and display apparatus can be reduced in thickness.

In the case of the light source device and display apparatus according to the present invention, the optical part which is a part of the optical plate member is supported by the optical support which is another part of the optical plate member, thereby eliminating the need for separately preparing a thick and robust component for supporting the optical part. In other words, the first accommodation part side of the light source device and display apparatus can be reduced in thickness.

Moreover, the second accommodation part side of the light source device and display apparatus functions as a stand for stationary installation or a fixing member for wall hanging or ceiling suspension. It is therefore possible to reduce the size of the light source device and display apparatus because it is not necessary to attach a separate stand or fixing member, which is separated from the casing, to the first accommodation part.

The above and further objects and features will more fully be apparent from the following detailed description with accompanying drawings.

BRIEF DESCRIPTION OF THE DRAWINGS

FIG. 8 is a side view schematically illustrating a configuration of a display apparatus according to Embodiment 4 of the present invention.

DETAILED DESCRIPTION

Figure 1:
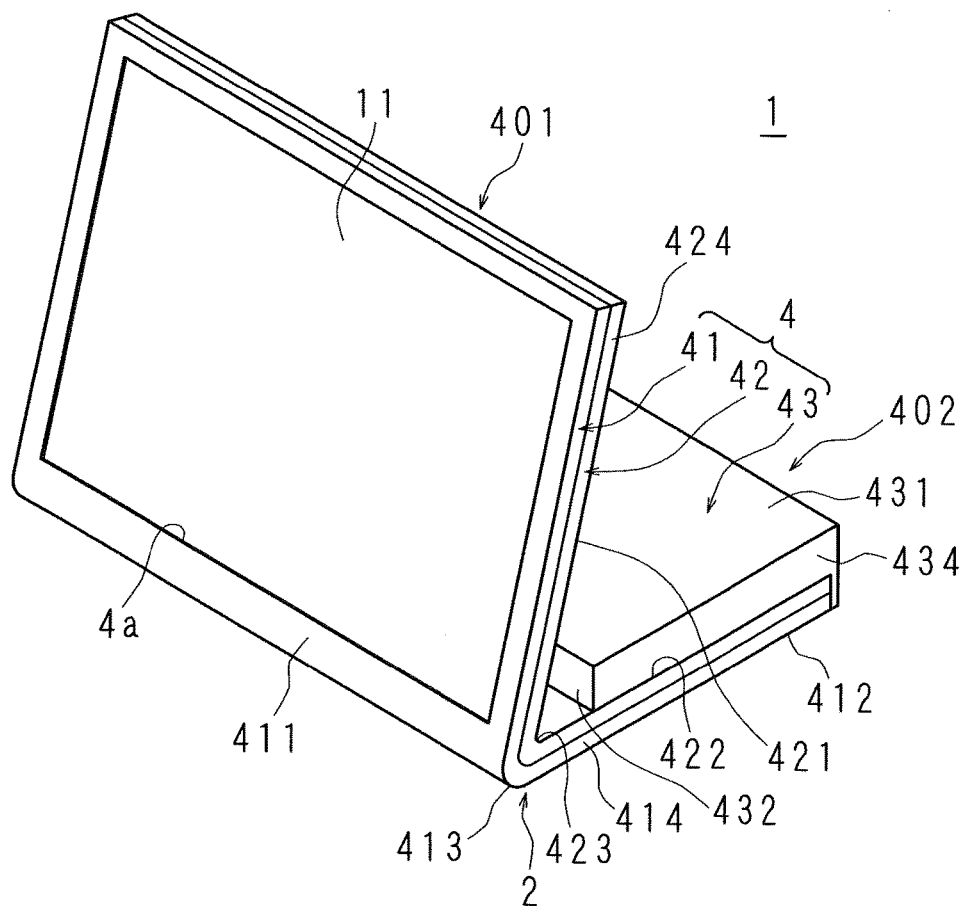
FIG. 1 is a perspective view schematically illustrating a configuration of a front side of a display apparatus according to Embodiment 1 of the present invention.

The present invention will be described in detail with reference to the drawings illustrating embodiments thereof. In the description below, upper and lower; front and back; as well as left and right indicated by arrows in the drawings are used.

Embodiment 1

Figure 2:
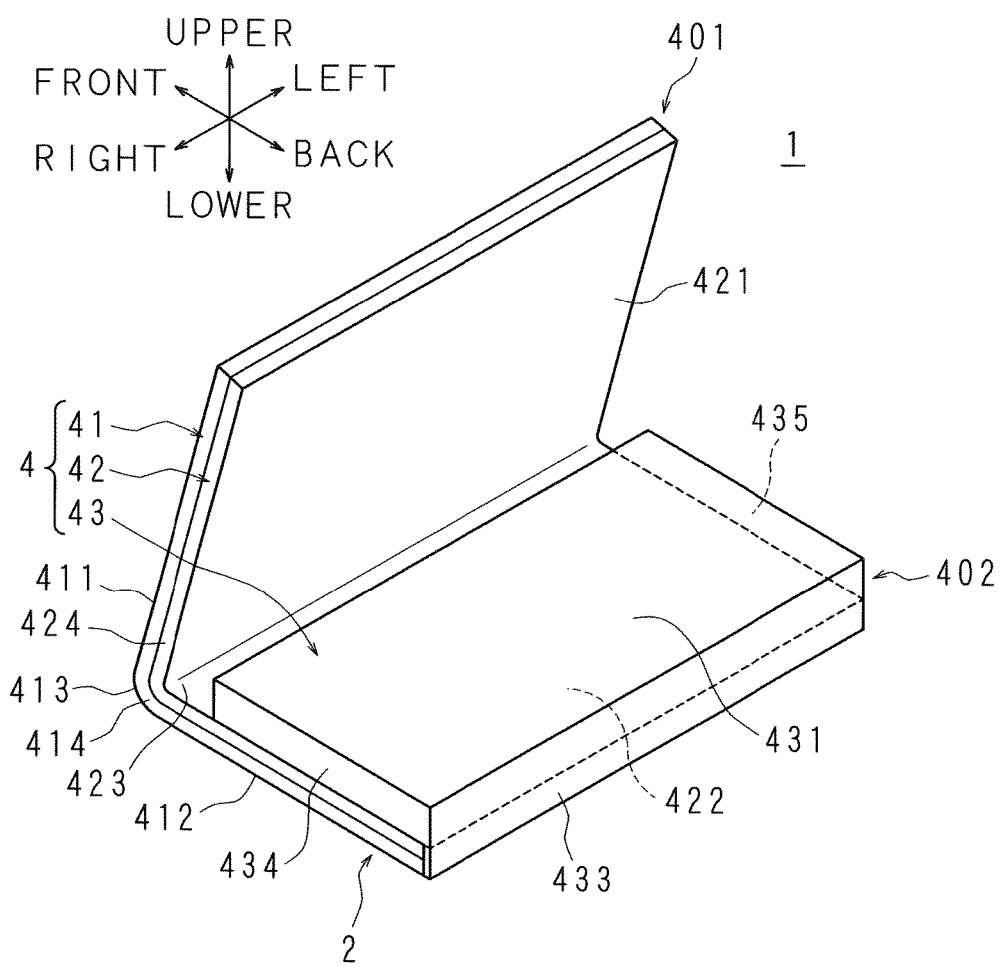
FIG. 2 is a perspective view schematically illustrating a configuration of a back side of the display apparatus.

FIG. 1 is a perspective view schematically illustrating a configuration of the front side of a display apparatus 1 according to Embodiment 1 of the present invention, and FIG. 2 is a perspective view schematically illustrating a configuration of the back side of the display apparatus 1.

Figure 3:
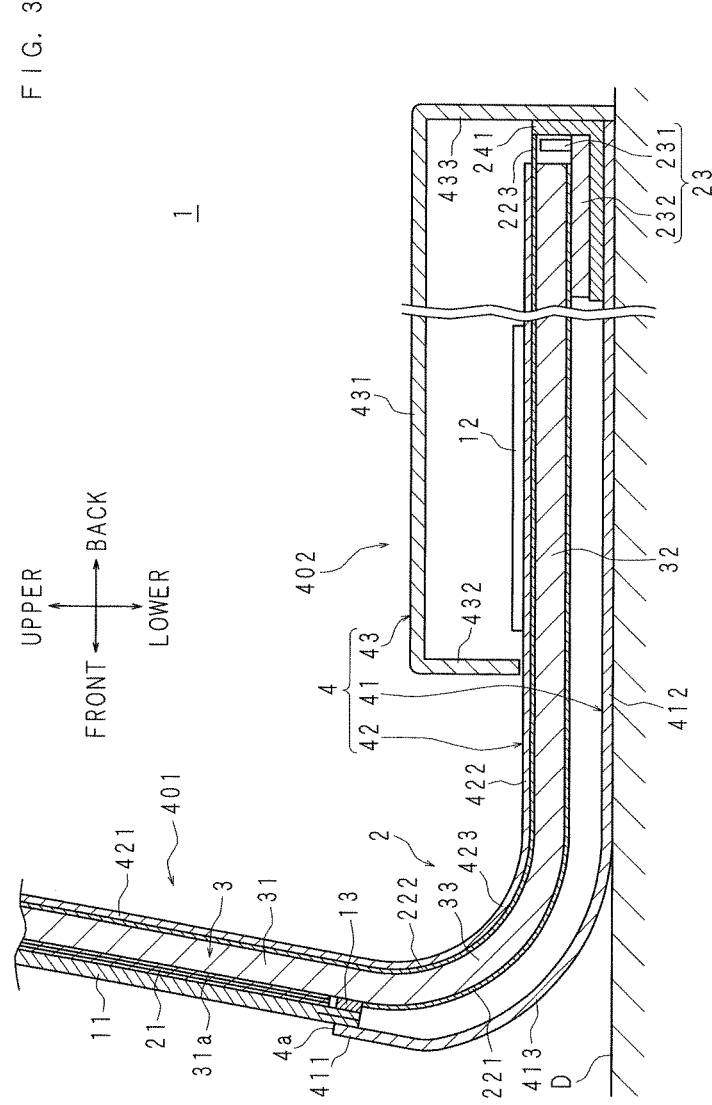
FIG. 3 is a section view schematically illustrating a configuration of the display apparatus.

FIG. 3 is a section view schematically illustrating a configuration of the display apparatus 1.

The display apparatus 1 according to the present embodiment is constituted as, for example, a television receiver, an electronic signboard, or a monitor for a personal computer.

The display apparatus 1 includes a display panel 11, circuit substrates 12, 12 . . . , an attachment member 13 and a light source device 2. The light source device 2 includes an optical sheet group 21, reflection sheets 221, 222 and 223, a light source 23, a heat sink 241, an optical plate member 3 and a casing 4.

First, each component of the display apparatus 1 is described.

The display panel 11 is constituted by a liquid-crystal display panel. The display panel 11 has the shape of a rectangular flat plate, and is arranged in an inclined posture with its upper hem located more backward than its lower hem. The display panel 11 has a rectangular display region and a rectangular frame-like border region surrounding the display region. The display panel 11 has a front side glass substrate and a back side glass substrate, and liquid crystal is sealed between the two glass substrates. The light transmission rate of the display panel 11 varies in accordance with the voltage applied to the liquid crystal in the display panel 11.

The optical sheet group 21 is constituted by a plurality of optical sheets, each having a rectangular shape, layered one on top of another. Each of the optical sheets constituting the optical sheet group 21 has a light diffusing function, light condensing function or the like. The optical sheet group 21 is placed in a backward-leaning posture which is in parallel with the display panel 11, and covers the display region of the display panel 11 at the back side of the display panel 11.

The optical plate member 3 is a plate member made of glass which is bent in a V shape. The optical plate member 3 is formed by bending a rectangular glass flat plate to have a V shape.

The optical plate member 3 has an optical part 31, an optical support 32 and an optical bent part 33.

The optical part 31 has the shape of a rectangular flat plate. The optical part 31 is placed in a backward-leaning posture which is in parallel with the display panel 11 at the back side of the optical sheet group 21.

The optical support 32 has the shape of a rectangular flat plate. The optical support 32 is arranged in a lateral posture at a position more backward than the lower hem of the optical part 31.

The angle formed by the optical part 31 and the optical support 32 is an acute angle, while the optical bent part 33 has an arc shape. The optical bent part 33 has a plate shape which integrally connects the lower hem of the optical part 31 and the front hem of the optical support 32.

In other words, the optical plate member 3 has the shape of a bent plate in which the optical part 31 is integrally connected with the optical support 32 which is located so as to intersect with the optical part 31.

The optical plate member 3 is so formed that the light entering inside the optical plate member 3 is outputted from the front surface 31a (one surface) of the optical part 31. To this end, a reflection part (not illustrated) is provided at each of a rear surface of the optical part 31 as well as upper and lower surfaces of the optical support 32 and both surfaces of the optical bent part 33. The light entering the reflection part is not easily outputted to the outside of the optical plate member 3, which suppresses undesirable leakage light from the optical plate member 3. The reflection part is, for example, a reflection dot formed by silk-screen printing or a concave part or the like formed by laser printing.

It is to be noted that the optical plate member 3 may have a configuration in that a reflection part is formed at each end face excluding the rear end face of the optical support 32.

The rear surface of the display panel 11 is attached to a front surface 31a of the optical part 31 by the attachment member 13. In other words, the display panel 11 is supported by the optical part 31.

The attachment member 13 according to the present embodiment is a double-sided tape having a thickness larger than that of the optical sheet group 21. The attachment member 13 is adhered to a border region on the rear surface of the display panel 11 so as to be in a rectangular frame-like shape. Therefore, the attachment member 13 functions not only as a bonding member for bonding the rear surface of the display panel 11 to the front surface 31a of the optical part 31, but also as a spacer for providing an appropriate space between the rear surface of the display panel 11 and the front surface 31a of the optical part 31.

It is to be noted that the attachment member 13 may also be configured using an adhesive and a spacer. The attachment member 13 is, however, more easily handled in the configuration with a double-sided tape, which also reduces the number of components.

A rectangular optical sheet group 21 is placed in a space between the rear surface of the display panel 11 and the front surface 31a of the optical part 31. The optical sheet group 21 is supported by the optical part 31 by, for example, the upper hem of the optical sheet group 21 being bonded to the optical part 31.

That is, the inclination for each of the display panel 11 and the optical sheet group 21 depends on the inclination of the optical part 31 with respect to the optical support 32.

The reflection sheet 221 has a rectangular shape, which entirely covers the surface on the front side of the optical bent part 33 and the lower surface of the optical support 32. The reflection sheet 222 has a rectangular shape, which entirely covers the rear surface of the optical part 31, the surface on the back side of the optical bent part 33 and the upper surface of the optical support 32. Accordingly, the leakage light from the rear surface of the optical part 31, both of the upper and lower surfaces of the optical support 32, and the both surfaces of the optical bent part 33 is reflected at any one of the reflection sheets 221 and 222, and enters inside the optical plate member 3 again.

The reflection sheets 221, 222 are attached to the optical plate member 3. To this end, for example, the peripheral parts of the reflection sheets 221, 222 are bonded to the peripheral part of the optical plate member 3 using an adhesive, an adhesive tape or the like.

The light source 23 includes a plurality of LEDs 231, 231 . . . (only one is illustrated in FIG. 3) and an LED substrate 232.

The LED substrate 232 has the shape of a rectangular flat plate which is long in the left-right direction and is in a lateral posture. The LED substrate 232 is located lower than the reflection sheet 222 covering the optical support 32. The front upper surface of the LED substrate 232 is in contact with the reflection sheet 222. The rear part of the LED substrate 232 protrudes more backward than the optical support 32 and reflection sheet 222.

LEDs 231, 231 . . . are mounted on the rear upper surface of the LED substrate 232 so as to be arranged in a line with equal intervals in the left-right direction. The LEDs 231, 231 . . . and the rear end face of the optical support 32 are opposed to each other with an appropriate distance in between.

As has been described above, the rear end face of the optical support 32 functions as a light entering region which is to receive the light emitted from the light source 23.

The heat sink 241 is formed in an angled shape having rectangular flat plate portions which are integrally formed and arranged in lateral and vertical postures respectively. At the upper surface of the lateral portion of the heat sink 241, the LED substrate 232 of the light source 23 is attached. The vertical portion of the heat sink 241 is opposed to the rear end face of the optical support 32 with an appropriate distance, while the LEDs 231, 231, . . . of the optical source 23 are arranged between the vertical portion of the heat sink 241 and the rear end face of the optical support 32.

The heat sink 241 is to release heat generated by the light source 23 to the outside of the display apparatus 1. However, a part of the heat generated by the light source 23 is transferred to the optical plate member 3.

The reflection sheet 223 is located between the rear end of the reflection sheet 222 and the upper end of the heat sink 241 so as not to be in contact with the light source 23.

Each of the circuit substrates 12, 12 . . . (only one is illustrated in FIG. 3) is a control board, power supply board or the like, which is to display an image on the display panel 11 or to turn on/off the light source 23.

The casing 4 is bent in a V shape, which accommodates therein the display panel 11, the circuit substrates 12, 12, . . . , the attachment member 13, the optical sheet group 21, the reflection sheets 221, 222, 223, the light source 23, the heat sink 241 and the optical plate member 3. The bending of the casing 4 corresponds to the bending of the optical plate member 3.

The casing 4 has a front cabinet 41, a back cabinet 42 and a cover 43.

The front cabinet 41 is bent in a V shape corresponding to the bending of the optical plate member 3, and integrally includes a front surface part 411, a lower surface part 412, a bent part 413 and a side surface part 414.

The front surface part 411 has a rectangular frame-like shape with an opening 4a. The front surface part 411 corresponds to the optical part 31, and covers the border region of the display panel 11 from the front side. The display region of the display panel 11 is exposed to the outside through the opening 4a of the front surface part 411.

The lower surface part 412 has a rectangular shape. The lower surface part 412 corresponds to the optical support 32, and covers from the lower side the reflection sheet 221 and the heat sink 241 that cover the optical support 32. The heat sink 241 is attached on the rear end of the lower surface part 412. The lower surface part 412 is placed on, for example, a top board of a desk D.

The bent part 413 has the shape of a cylindrical plane projecting toward the front side. The bent part 413 integrally connects the lower hem of the front surface part 411 and the front hem of the lower surface part 412. The bent part 413 corresponds to the optical bent part 33 and covers the reflection sheet 221 covering the optical bent part 33.

The side surface part 414 protrudes from the front surface part 411, the lower surface part 412 excluding the rear end and the peripheral part of the bent part 413 toward the back side or upper side.

The back cabinet 42 is bent in the V shape which corresponds to the bending of the optical plate member 3, and integrally includes a rear surface part 421, an upper surface part 422, a bent part 423 and a side surface part 424.

The rear surface part 421 has a rectangular shape. The rear surface part 421 corresponds to the optical part 31, and covers the reflection sheet 222 covering the optical part 31 from the back side. Here, the rear surface part 421 and the optical part 31 sandwich and hold the reflection sheet 222 between them.

The upper surface part 422 has a rectangular shape. The upper surface part 422 corresponds to the optical support 32, and covers the reflection sheet 222 covering the optical support 32 from the upper side. Here, the upper surface part 422 and the optical support 32 sandwich and hold the reflection sheet 222 between them. The circuit substrates 12, 12 . . . are attached to the surface at the upper side of the upper surface part 422.

The bent part 423 has the shape of a cylindrical plane projecting toward the front side. The bent part 423 integrally connects the lower hem of the rear surface part 421 and the front hem of the upper surface part 422. The bent part 423 corresponds to the optical bent part 33 and covers the reflection sheet 222 covering the optical bent part 33. Here, the bent part 423 and the optical bent part 33 sandwich and hold the reflection sheet 222 between them.

The side surface part 424 protrudes to the front side or lower side from the rear surface part 421 excluding the rear end of the upper surface part 422, the upper surface part 422 and the peripheral part of the bent part 423.

The respective side surface parts 414 and 424 of the front cabinet 41 and the back cabinet 42 are connected with each other.

The cover 43 has the shape of a rectangular dish, and integrally includes an upper surface part 431 corresponding to the bottom surface of a dish, a front surface part 432 corresponding to the circumferential surface of a dish, a rear surface part 433, a left surface part 434 and a right surface part 435.

The upper surface part 431 has a rectangular shape, and covers the circuit substrates 12, 12 . . . on the upper surface part 422 of the back cabinet 42.

The front surface part 432, the left surface part 434 and the right surface part 435 protrude downward from the front hem, left hem and right hem of the upper surface part 431, the respective lower ends thereof being connected to the back cabinet 42.

The rear surface part 433 protrudes downward from the rear hem of the upper surface part 431, the lower end thereof being connected to the front cabinet 41. The rear surface part 433 is in contact with the heat sink 241.

The heat transferred to the heat sink 241 is further transferred to the lower surface part 412 of the front cabinet 41 and the rear surface part 433 of the cover 43, and is released to the outside of the display apparatus 1.

The front surface part 411 of the front cabinet 41 as well as the side surface part 414 protruding from the front surface part 411 and the rear surface part 421 of the back cabinet 42 as well as the side surface part 424 protruding from the rear surface part 421 constitute the first accommodation part 401 of the casing 4. The first accommodation part 401 of the casing 4 has the opening 4a. In the first accommodation part 401 of the casing 4, the display panel 11, the attachment member 13, the optical sheet group 21, the reflection sheet 222 covering the optical part 31, and the optical part 31 are accommodated.

The lower surface part 412 of the front cabinet 41 as well as the side surface part 414 protruding from the lower surface part 412, the upper surface part 422 of the back cabinet 42 as well as the side surface part 424 protruding from the upper surface part 422, and the cover 43 constitute the second accommodation part 402 of the casing 4. The second accommodation part 402 of the casing 4 is placed on a top board of the desk D. In the second accommodation part 402 of the casing 4, the circuit substrates 12, 12 . . . , the reflection sheets 221, 222 covering the optical support 32, the reflection sheet 223, the light source 23, the heat sink 241 and the optical support 32 are accommodated.

Next, illumination of the display panel 11 by the light source device 2 is described.

The light emitted by the light source 23 enters the inside of the optical support 32 from the rear end face of the optical support 32 directly or by being reflected at the reflection sheet 223.

The light entering inside the optical support 32 is reflected at the upper and lower surfaces of the optical support 32, both surfaces of the optical bent part 33, the rear surface of the optical part 31, a reflection part located at the optical plate member 3, and/or the reflection sheets 221, 222, and is eventually outputted from the front surface 31a of the optical part 31 to the optical sheet group 21.

The light outputted to the optical sheet group 21 is, for example, diffused and condensed by the optical sheet group 21, and enters inside the display panel 11 from the rear surface of the display panel 11.

As a result, the display panel 11 is illuminated by the light source device 2 from the back side.

The light entered inside the display panel 11 passes through the display region of the display panel 11, and is outputted to the outside through the opening 4a of the casing 4. This means that the light outputted from the front surface 31a of the optical part 31 passes through the opening 4a to be outputted to the outside.

Alternatively, the light entered inside the display panel 11 is blocked by the display panel 11.

As a result, an image is displayed in the display region of the display panel 11.

The display apparatus 1 as described above functions, at the side of the first accommodation part 401 of the display apparatus 1 (i.e. the first accommodation part 401 of the casing 4 and each component accommodated therein) similarly to the liquid-crystal display module constituting the conventional liquid-crystal display apparatus.

While the display apparatus 1 is a stationary type, there is no need to attach a support strut of a stand to the back side of the first accommodation part 401 of the casing 4, as provided in the conventional stationary liquid-crystal display apparatus. It is thus possible to reduce the thickness of the display apparatus 1 at the first accommodation part 401 side. Moreover, as the display apparatus 1 is bent in the V shape while the first accommodation part 401 side of the display apparatus 1 is thin, the display apparatus 1 has an impressive shape with an improved design compared to the conventional stationary liquid-crystal display apparatus.

Furthermore, since the circuit substrates 12, 12, . . . , the optical support 32, the optical source 23 and the like are accommodated in the second accommodation part 402 of the casing 4, it is possible to attempt reduction in size and weight of the first accommodation part 401 side of the display apparatus 1 while increasing the weight of the second accommodation part 402 side of the display apparatus 1 (i.e. total weight of the second accommodation part 402 of the casing 4 and each component accommodated therein), which can stabilize the stationary installation.

Note that the light source device 2 may be provided with two light sources instead of the light source 23. In this case, the two light sources may be located respectively at the left and right sides of the optical support 32.

Moreover, the light source 23 is not limited to the configuration with the LEDs 231, 231 . . . and the LED substrate 232, but may have a configuration using, for example, a fluorescent tube. Here, the light source 23 may be opposed to both or one of the surfaces of the optical support 32. Here, the reflection sheets 221, 222 cover the both or one of the surfaces of the optical support part 32 except for the light entering region which is to receive the light emitted from the light source 23.

It is to be noted that the light source 23 or the circuit substrates 12, 12 . . . may be accommodated in the first accommodation part 401 of the casing 4.

However, in the case where the light source 23 or the circuit substrates 12, 12, . . . are accommodated in the first accommodation part 401 of the casing 4, the first accommodation part 401 side of the display apparatus 1 may be increased in size or the center of gravity of the display apparatus 1 may be higher, possibly losing stability. Moreover, in the case where the light source 23 is accommodated in the first accommodation part 401 of the casing 4, the heat generated by the light source 23 is easily transferred to the optical sheet group 21 which is generally susceptible to heat expansion and the display panel 11 which easily causes a defect due to heat.

It is thus advantageous to accommodate the light source 23 and the circuit substrates 12, 12 . . . in the second accommodation part 402 of the casing 4.

As the optical plate member 3 of the display apparatus 1 is made of glass, which is more insusceptible to heat expansion compared to the case of the optical plate member 3 made of synthetic resin. Accordingly, the separation distance between the LEDs 231, 231 . . . and the rear end face of the optical support 32 can be shortened compared to the case of the optical plate member 3 being made of synthetic resin. It is thus possible to reduce the size of the display apparatus 1.

Note that the optical plate member 3 is not limited to be made of glass but may also be made of synthetic resin, or glass fiber reinforced plastic, as long as no problem occurs in terms of rigidity, heat resistance, optical property and the like.

The display panel 11, the optical sheet group 21, the reflection sheet 222 and the optical part 31 may be supported by a support member (not illustrated) accommodated in the first accommodation part 401 of the casing 4 (for example, a bezel, a P chassis, a backlight chassis or the like included in the conventional liquid-crystal display apparatus).

In this case, however, the first accommodation part 401 side of the display apparatus 1 may be increased in size or the display apparatus 1 may lose stability because the center of gravity of the display apparatus 1 becomes higher. Moreover, the optical part 31 is supported by the optical support 32 through the optical bent part 33, while the display panel 11 and optical sheet group 21 are supported by the optical plate member 3, presenting no particular problem even if the optical part 31 is not supported by the support member described earlier.

It is to be noted that the optical plate member 3 may be bent in an L shape, a U shape or an obtuse V shape. In the case of the L shape or V shape, the optical part 31 and the optical support 32 are arranged to intersect with each other, while the optical part 31 and the optical support 32 are arranged to be opposed to each other in the case of the U shape. In any case, the casing 4 has a bent shape which corresponds to the bending of the optical plate member 3.

Embodiment 2

Figure 4:
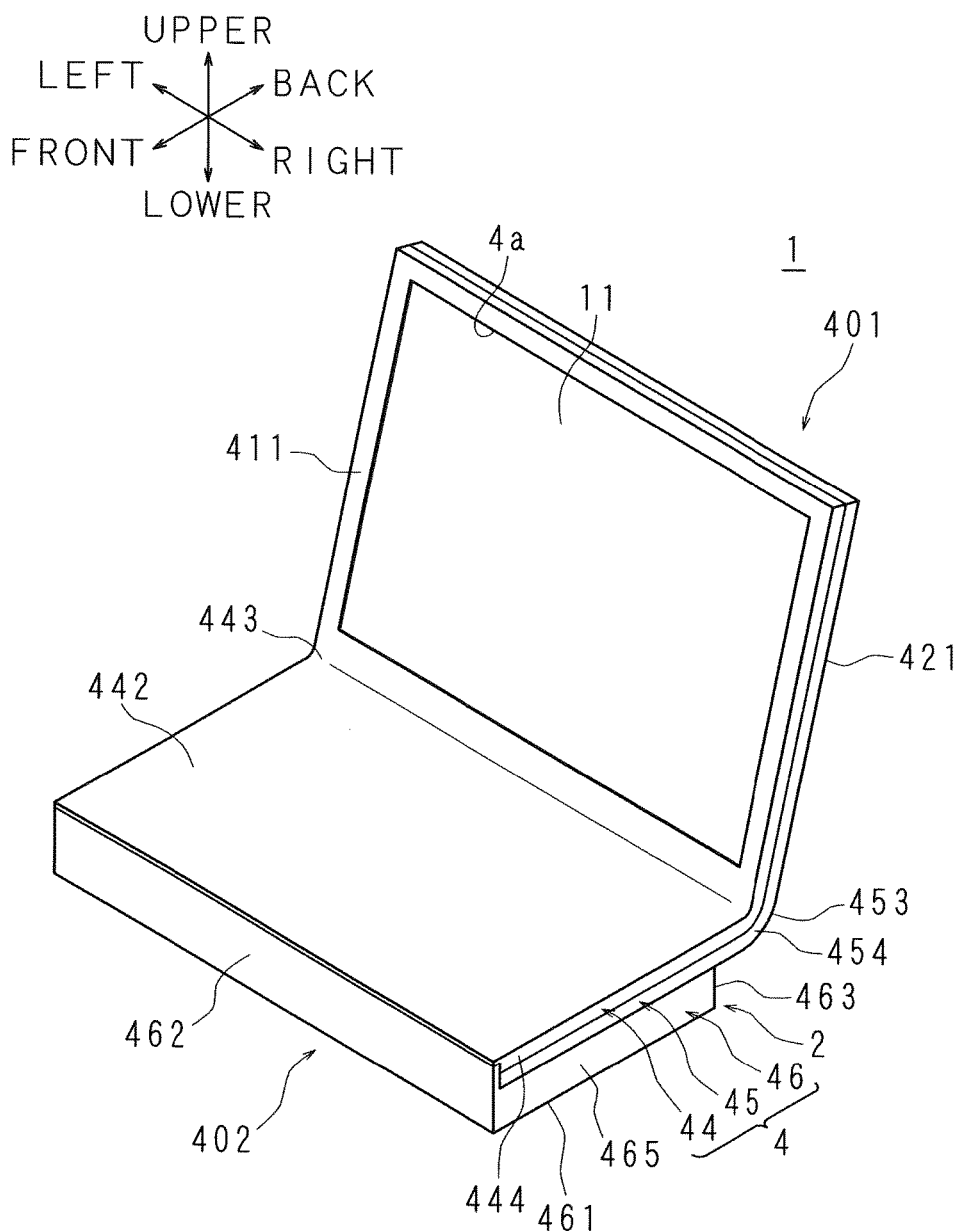
FIG. 4 is a perspective view schematically illustrating a configuration of a display apparatus according to Embodiment 2 of the present invention.

FIG. 4 is a perspective view schematically illustrating a configuration of the display apparatus 1 according to Embodiment 2 of the present invention.

Figure 5:
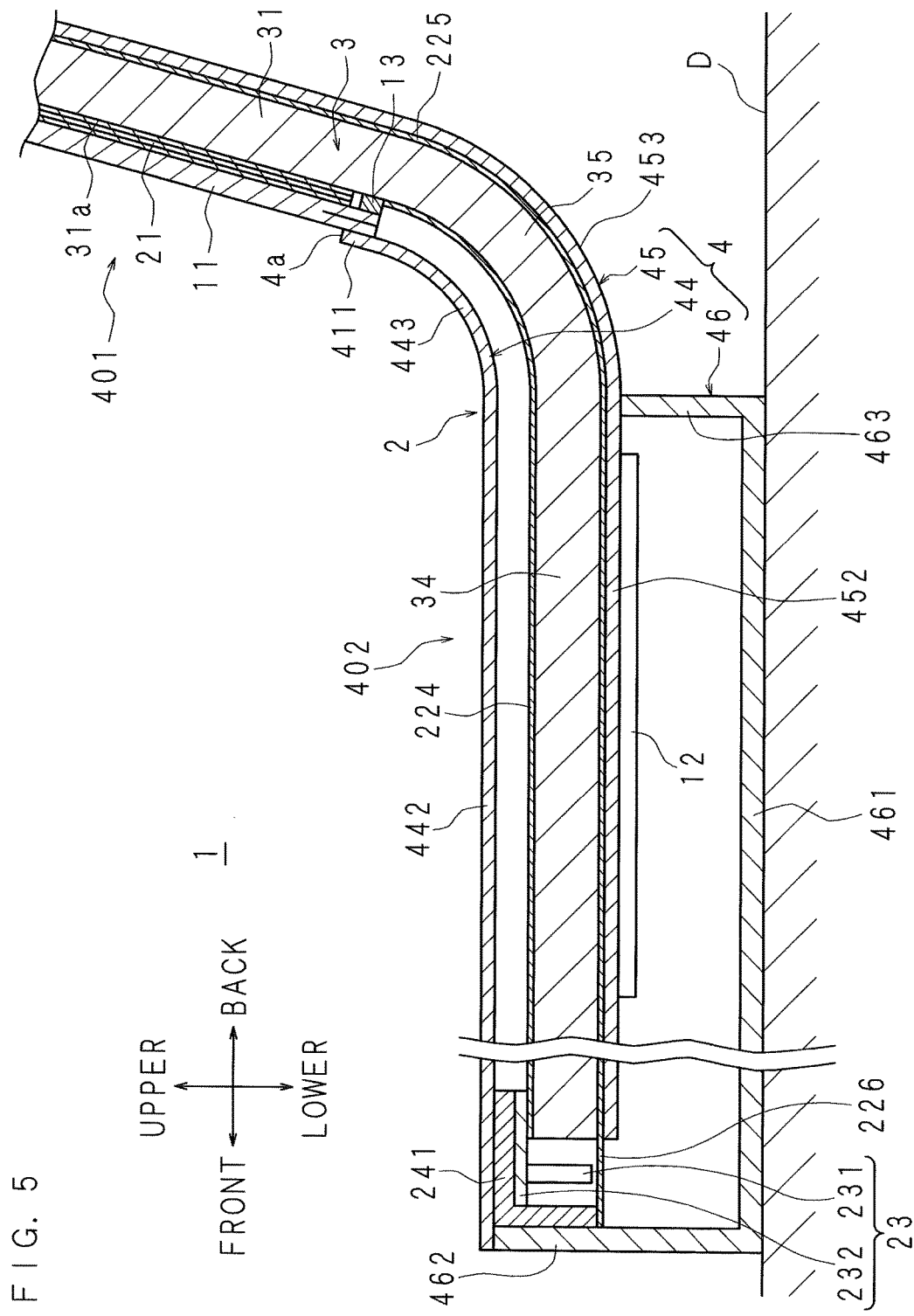
FIG. 5 is a section view schematically illustrating a configuration of the display apparatus.

FIG. 5 is a section view schematically illustrating a configuration of the display apparatus 1.

The display apparatus 1 according to the present embodiment has a configuration substantially similar to the display apparatus 1 according to Embodiment 1. In the description below, only the parts different from those in Embodiment 1 will be described while the other parts corresponding to those in Embodiment 1 will be denoted by the same reference numbers and will not be described.

The optical plate member 3 has an optical support 34 and an optical bent part 35 in place of the optical support part 32 and the optical bent part 33 in Embodiment 1.

The optical support 34 has the shape of a rectangular flat plate. The optical support 34 is arranged in a lateral posture at a position more forward than the lower hem of the optical part 31. A reflection part (not illustrated) is provided at each of the upper and lower surfaces of the optical support 34.

The angle formed by the optical part 31 and the optical support 34 is an obtuse angle, and the optical bent part 35 has an arc shape. The optical bent part 35 has a plate shape in which the lower hem of the optical part 31 and the rear hem of the optical support 34 are integrally connected with each other. A reflection part (not illustrated) is provided at each of both surfaces of the optical bent part 35.

The display panel 11 and the optical sheet group 21 are supported by the optical part 31 as in the case of Embodiment 1. That is, the inclination of each of the display panel 11 and the optical sheet group 21 according to the present embodiment depends on the inclination of the optical part 31 with respect to the optical support 34.

The display apparatus 1 includes reflection sheets 224, 225 in place of the reflection sheets 221, 222 in Embodiment 1.

The reflection sheet 224 has a rectangular shape, and entirely covers a surface on the front side of the optical bent part 35 and an upper surface and rear end face of the optical support 34. The reflection sheet 225 has a rectangular shape, and entirely covers the rear surface of the optical part 31, a surface on the back side of the optical bent part 35 and a lower surface of the optical support 34. Accordingly, the leakage light from the rear surface of the optical part 31, the upper and lower surfaces of the optical support 34 and both surfaces of the optical bent part 35 is reflected by any one of the reflection sheets 224 and 225, and enters inside the optical plate member 3 again.

The reflection sheets 224 and 225 are attached to the optical plate member 3 similarly to the reflection sheets 221 and 222 in Embodiment 1.

The LED substrate 232 of the light source 23 is located at an upper side than the reflection sheet 224 covering the optical support 34. The lower surface at the rear part of the LED substrate 232 is in contact with the reflection sheet 224. The front part of the LED substrate 232 protrudes more forward than the optical support 34 and the reflection sheet 224.

The LEDs 231, 231 . . . of the light source 23 are mounted at the lower surface of the front part of the LED substrate 232. The LEDs 231, 231 . . . and the front end face of the optical support 34 are opposed to each other with an appropriate distance in between.

In view of the description above, the front end face of the optical support 34 functions as a light entering region which is to receive the light emitted from the light source 23.

The LED substrate 232 of the light source 23 is attached to the lower surface of the lateral portion of the heat sink 241. The vertical portion of the heat sink 241 is arranged to be opposed to the front end face of the optical support 34 with an appropriate distance in between, and the LEDs 231, 231, . . . of the light source 23 are arranged between the vertical portion of the heat sink 241 and the rear end face of the optical support 32.

The display apparatus 1 includes a reflection sheet 226 in place of the reflection sheet 223 in Embodiment 1.

The reflection sheet 226 is located between the front end of the reflection sheet 225 and the lower end of the heat sink 241 so as not to be in contact with the light source 23.

The casing 4 is bent in the V shape which corresponds to the bending of the optical plate member 3. The casing 4 accommodates therein the display panel 11, the circuit substrates 12, 12, . . . , the attachment member 13, the optical sheet group 21, the reflection sheets 224, 225, 226, the light source 23, the heat sink 241 and the optical plate member 3.

The casing 4 includes a front cabinet 44, a back cabinet 45 and a cover 46 in place of the front cabinet 41, the back cabinet 42 and the cover 43 in Embodiment 1.

The front cabinet 44 is bent in the V shape, and integrally includes a front surface part 411, an upper surface part 442, a bent part 443 and a side surface part 444.

The upper surface part 442 has a rectangular shape. The upper surface part 442 corresponds to the optical support 34, and covers from the upper side the reflection sheet 224 which covers the upper surface of the optical support 34. The heat sink 241 is attached to the front end of the upper surface part 442. The heat transferred to the heat sink 241 is further transferred to the upper surface part 442 and is released to the outside of the display apparatus 1.

The bent part 443 has the shape of a cylindrical plane recessed on the front side. The bent part 443 integrally connects the lower hem of the front surface part 411 and the rear hem of the upper surface part 442. The bent part 443 corresponds to the optical bent part 35 and covers the reflection sheet 224 which covers the optical bent part 35.

The side surface part 444 protrudes to the back side or lower side from the front surface part 411, the upper surface part 442 excluding the front end, and the peripheral part of the bent part 443.

The back cabinet 45 is bent in the V shape, and integrally includes the rear surface part 421, the lower surface part 452, the bent part 453 and the side surface part 454.

The rear surface part 421 covers from the back side the reflection sheet 225 which covers the optical part 31. Here, the rear surface part 421 and the optical part 31 sandwich and hold the reflection sheet 225 between them.

The lower surface part 452 has a rectangular shape. The lower surface part 452 corresponds to the optical support 34 and covers the reflection sheet 225 covering the optical support 34 from the lower side. Here, the lower surface part 452 and the optical support 34 sandwich and hold the reflection sheet 225 between them. The circuit substrates 12, 12 . . . are attached to the surface on the lower side of the lower surface part 452.

The bent part 453 has the shape of a cylindrical plane recessed on the front side. The bent part 453 integrally connects the lower hem of the rear surface part 421 and the rear hem of the lower surface part 452. The bent part 453 corresponds to the optical bent part 35 and covers the reflection sheet 225 which covers the optical bent part 35. Here, the bent part 453 and the optical bent part 35 sandwich and hold the reflection sheet 225 between them.

The side surface part 454 protrudes from the rear surface part 421, the lower surface part 452 excluding the front end and the peripheral part of the bent part 453 to the front side or the upper side.

The respective side surface parts 444 and 454 of the front cabinet 44 and back cabinet 45 are connected with each other.

The cover 46 has the shape of a rectangular dish, and integrally includes a lower surface part 461 corresponding to the bottom surface of a dish, a front surface part 462 corresponding to the circumferential surface of a dish, a rear surface part 463, a left surface part (not illustrated) and a right surface part 465.

The lower surface part 461 has a rectangular shape, and covers the circuit substrates 12, 12 . . . attached to the lower surface part 452 of the back cabinet 45. The lower surface part 461 is placed on, for example, the top board of the desk D.

The rear surface part 463, the left surface part and the right surface part 465 protrudes upward from the rear hem, the left hem and the right hem of the lower surface part 461, the respective upper ends thereof being connected to the back cabinet 45.

The front surface part 462 protrudes upward from the front hem of the lower surface part 461, the upper end thereof being connected to the front cabinet 44.

The front surface part 411 of the front cabinet 44 as well as the side surface part 444 protruding from the front surface part 411 and the rear surface part 421 of the back cabinet 45 as well as the side surface part 454 protruding from the rear surface part 421 constitute the first accommodation part 401 of the casing 4. The first accommodation part 401 of the casing 4 has the opening 4a. In the first accommodation part 401 of the casing 4, the display panel 11, the attachment member 13, the optical sheet group 21, the reflection sheet 225 covering the optical part 31, and the optical part 31 are accommodated.

The upper surface part 442 of the front cabinet 44 as well as the side surface part 444 protruding from the upper surface part 442, the lower surface part 452 of the back cabinet 45 as well as the side surface part 454 protruding from the lower surface part 452, and the cover 46 constitute the second accommodation part 402 of the casing 4. The second accommodation part 402 of the casing 4 is placed on the top board of the desk D. In the second accommodation part 402 of the casing 4, the circuit substrates 12, 12 . . . , the reflection sheets 224, 225 covering the optical support 34, the reflection sheet 226, the light source 23, the heat sink 241, and the optical support 34 are accommodated.

Next, illumination of the display panel 11 by the light source device 2 is described.

The light emitted by the light source 23 enters the inside of the optical support 34 from the lower surface of the front hem of the optical support 34 directly or by being reflected at the reflection sheet 226.

The light entering inside the optical support 34 is reflected at the upper and lower surfaces of the optical support 34, both surfaces of the optical bent part 35, the rear surface of the optical part 31, a reflection part located at the optical plate member 3, and/or the reflection sheets 224, 225, and is eventually outputted from the front surface 31a of the optical part 31 to the optical sheet group 21.

The light outputted to the optical sheet group 21 is, for example, diffused and condensed by the optical sheet group 21, and enters inside the display panel 11 from the rear surface of the display panel 11.

As a result, the display panel 11 is illuminated by the light source device 2 from the back side.

The display apparatus 1 as described above produces a functional effect similar to that of the display apparatus 1 according to Embodiment 1.

Note that the optical plate member 3 may also be bent in an L shape or an acute V shape. In this case, the casing 4 forms a bent shape similar to the bending of the optical plate member 3.

While Embodiments 1 and 2 illustrated the cases where an end face of the optical plate member 3 is a light entering region, a part of a wide surface of the optical plate member 3 may alternatively be the light entering region, not limited to the illustrated examples.

Embodiment 3

Figure 6:
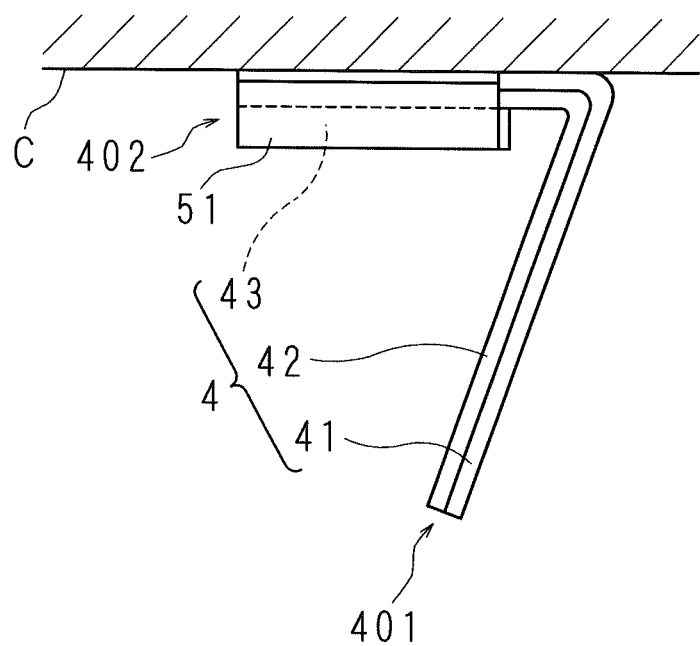
FIG. 6 is a side view schematically illustrating a configuration of a display apparatus according to Embodiment 3 of the present invention.

FIG. 6 is a side view schematically illustrating a configuration of a display apparatus 1 according to Embodiment 3 of the present invention.

Figure 7:
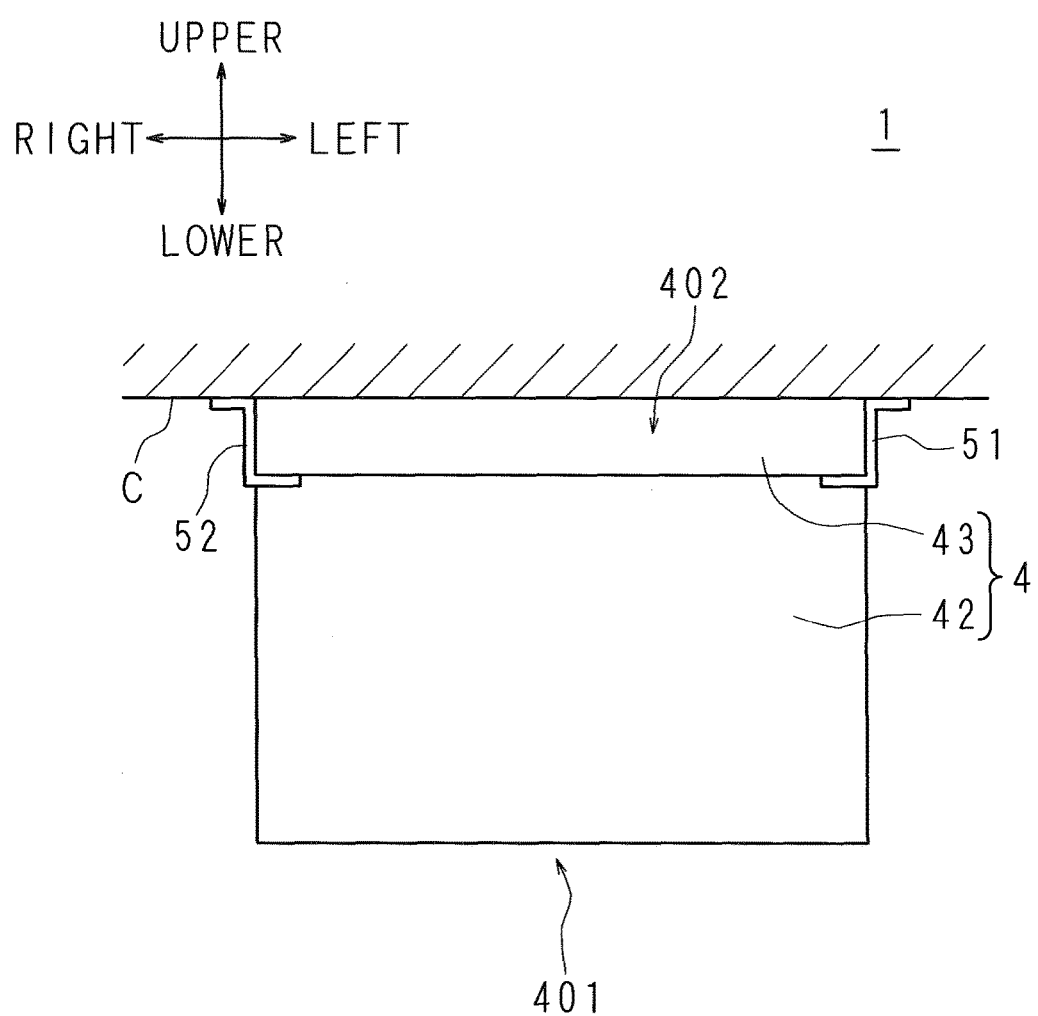
FIG. 7 is a back view schematically illustrating a configuration of the display apparatus.

FIG. 7 is a back view schematically illustrating a configuration of the display apparatus 1.

The display apparatus 1 according to the present embodiment has a configuration substantially similar to that of the display apparatus 1 in Embodiment 1. In the description below, only the parts different from those in Embodiment 1 will be described while the other parts corresponding to those in Embodiment 1 will be denoted by the same reference numbers and will not be described.

The display apparatus 1 in Embodiment 1 is a stationary type, whereas the display apparatus 1 in the present embodiment is a ceiling-suspended type.

The display apparatus 1 is an inversion of the display apparatus 1 in Embodiment 1. An image displayed in the display region of a display panel 11 in the present embodiment is an upside-down image of the image displayed in the display region of the display panel 11 in Embodiment 1.

The display apparatus 1 includes fixing members 51 and 52 for being suspended from a ceiling. Each of the fixing members 51 and 52 is screwed to a ceiling C and the second accommodation part 402 of the casing 4. As a result, the casing 4 is suspended from the ceiling C through the fixing members 51 and 52. To this end, each of the fixing members 51 and 52 is constituted by a Z-shaped metal fitting having a flat plate portion in a vertical posture and two flat plate portions, each having a lateral posture, which protrude in the opposite directions from both of the upper and lower ends of the vertical flat plate portion, and which are to be screwed to the ceiling C and the second accommodation part 402.

In the display apparatus 1 as described above, as in the display apparatus 1 according to Embodiment 1, the first accommodation part 401 side of the display apparatus 1 functions similarly to the liquid-crystal display module configuring the conventional liquid-crystal display apparatus.

It is not necessary to attach a fixing member, as provided in the conventional ceiling-suspended liquid-crystal display apparatus, at the back side of the first accommodation part 401 of the casing 4. This allows the first accommodation part 401 side of the display apparatus 1 to be thinner.

Furthermore, since the display apparatus 1 according to the present embodiment can be obtained by adding the fixing members 51, 52 and screws for fixing (not illustrated) to the display apparatus 1 of Embodiment 1 while vertically inverting the image displayed in the display region of the display panel 11 to be upside down, it may be possible for the stationary display apparatus 1 and the ceiling-suspended display apparatus 1 to use common parts.

Note that the ceiling-suspended display apparatus 1 may also be configured by adding the fixing members 51, 52 and screws for fixing (not illustrated) to the display apparatus 1 of Embodiment 2 while the image displayed in the display region of the display panel 11 is vertically inverted.

Embodiment 4

FIG. 8 is a side view schematically illustrating a configuration of the display apparatus 1 according to Embodiment 4 of the present invention.

The display apparatus 1 according to the present embodiment has a configuration substantially similar to the display apparatus 1 in Embodiment 2. In the description below, only the parts different from those in Embodiment 2 will be described while the other parts corresponding to those in Embodiment 2 will be denoted by the same reference numbers and will not be described.

The display apparatus 1 according to Embodiment 2 is a stationary type, whereas the display apparatus 1 according to the present embodiment is a wall-hanging type.

The display apparatus 1 is an inversion of the display apparatus 1 in Embodiment 2. An image displayed in the display region of a display panel 11 in the present embodiment is an upside-down image of the image displayed in the display region of the display panel 11 in Embodiment 2.

The display apparatus 1 includes a display hanger 53 having the shape of a wall shelf, and a fixing member 54. The display hanger 53 is screwed to a wall W. The fixing member 54 has a shape similar to that of the fixing member 51 or 52 in Embodiment 3, and is screwed to the display hanger 53 and the second accommodation part 402 of the casing 4. As a result, the casing 4 is hung and fixed to the wall W through the display hanger 53 and the fixing member 54.

In the display apparatus 1 as described above, as in the display apparatus 1 according to Embodiment 2, the first accommodation part 401 side of the display apparatus 1 functions similarly to the liquid-crystal display module constituting the conventional liquid-crystal display apparatus.

It is not necessary to attach a display hanger or a fixing member, as provided in the conventional wall-hanging liquid-crystal display apparatus, on the back side of the first accommodation part 401 of the casing 4. This allows the first accommodation part 401 side of the display apparatus 1 to be thinner.

Furthermore, since the display apparatus 1 according to the present embodiment can be obtained by adding the display hanger 53 and the fixing member 54 as well as screws for fixing (not illustrated) to the display apparatus 1 of Embodiment 2 while vertically inverting the image displayed in the display region of the display panel 11 to be upside down, it may be possible for the stationary display apparatus 1 and the wall-hanging display apparatus 1 to use common parts.

Note that the wall-hanging display apparatus 1 may also be obtained by adding the display hanger 53 and the fixing member 54 as well as screws for fixing (not illustrated) to the display apparatus 1 of Embodiment 1 while the image displayed in the display region of the display panel 11 is vertically inverted.

Embodiment 5

Figure 9:
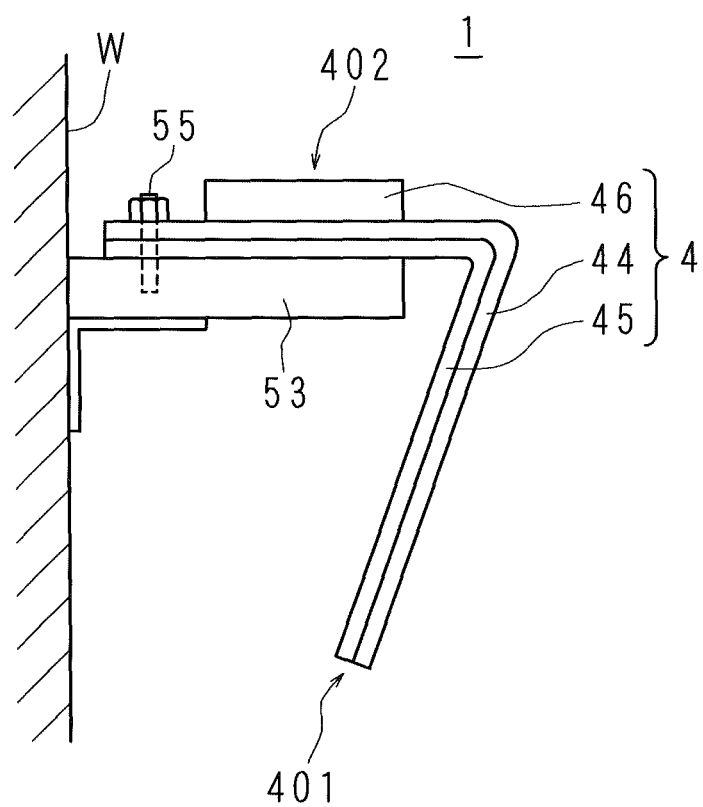
FIG. 9 is a side view schematically illustrating a configuration of a display apparatus according to Embodiment 5 of the present invention.

FIG. 9 is a side view schematically illustrating a configuration of a display apparatus 1 according to Embodiment 5 of the present invention.

The display apparatus 1 according to the present embodiment has a configuration substantially similar to that of the display apparatus 1 in Embodiment 4. In the description below, only the parts different from those in Embodiment 4 will be described while the other parts corresponding to those in Embodiment 4 will be denoted by the same reference numbers and will not be described.

The front cabinet 44 and the back cabinet 45 included in the display apparatus 1 according to the present embodiment protrude more backward than the cover 46. Thus, the side surface part 444 of the front cabinet 44 protrudes toward the back side or lower side from the front surface part 411, the upper surface part 442 including the front end and a peripheral part of the bent part 443, while the side surface part 454 of the back cabinet 45 protrudes toward the front side or upper side from the rear surface part 421, the lower surface part 452 including the front end and a peripheral part of the bent part 453. Furthermore, the front surface part 462 of the cover 46 protrudes upward from the front hem of the lower surface part 461, the upper end thereof being connected to the back cabinet 45.

The rearward protruding parts of the front cabinet 44 and back cabinet 45 are provided with through holes (not illustrated).

The display apparatus 1 includes an insertion member 55 in place of the fixing member 54. The insertion member 55 is formed by, for example, a bolt or nut. The insertion member 55 is inserted into the through holes of the front cabinet 44 and back cabinet 45 in the second accommodation part 402 of the casing 4, and is attached to the display hanger 53. As a result, the casing 4 is hung and fixed to the wall W through the display hanger 53 and the insertion member 55.

In the display apparatus 1 as described above, as in the display apparatus 1 according to Embodiment 4, the first accommodation part 401 side of the display apparatus 1 functions similarly to the liquid-crystal display module constituting the conventional liquid-crystal display apparatus.

It is not necessary to attach a display hanger or a fixing member, as provided in the conventional wall-hanging liquid-crystal display apparatus, on the back side of the first accommodation part 401 of the casing 4. This allows the first accommodation part 401 side of the display apparatus 1 to be thinner.

The light source device according to embodiments of the present invention is not limited to the light source device 2 embedded into the display apparatus 1. For example, the light source device may also be configured as a ceiling light, a wall-hanging illumination device or the like.

The embodiments disclosed herein are to be construed as illustrative and not restrictive in all aspects. The scope of the invention is defined by the appended claims rather than by the description preceding them, and all changes that fall within metes and bounds of the claims, or equivalence of such metes and bounds thereof are therefore intended to be embraced by the claims.

Furthermore, as long as the effect of the present invention can be assured, the display apparatus 1 or light source device 2 may include components not disclosed in Embodiments 1 to 5.

The components (technical features) disclosed in the embodiments can be combined with one another, while the combination thereof can form a new technical feature.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A light source device, comprising:
   a light source;
   a casing in which the light source is accommodated; and
   an optical plate member having a shape of a bent plate and including an optical part formed in a plate shape with one surface outputting light emitted from the light source, and an optical support formed in a plate shape for supporting the optical part, the optical support being integrally connected with the optical part and being so arranged as to intersect with or to be opposed to the optical part,
   wherein the casing integrally includes:
   a first accommodation part having an opening and accommodating the optical part such that light outputted from the one surface is outputted to an outside through the opening; and
   a second accommodation part which accommodates the optical support and is configured to be placed on or attached to an external part outside the light source device.

2. The light source device according to claim 1,
   wherein the light source is accommodated in the second accommodation part so as to be opposed to the optical support.

3. The light source device according to claim 1, wherein the optical plate member is configured by using glass.

4. A display apparatus, comprising:
   the light source device according to claim 1; and
   a display panel illuminated from a back side by the light source device,
   wherein the display panel is accommodated in the first accommodation part such that a display region of the display panel is exposed to an outside through the opening.

5. The display apparatus according to claim 4, further comprising
   a circuit substrate for displaying an image on the display panel, the circuit substrate being located in the second accommodation part.

6. The display apparatus according to claim 4,
   wherein the display panel is attached to the optical part, the display panel being separated from the one surface of the optical part by an appropriate distance, and
   an optical sheet is placed between the display panel and the one surface.

7. The light source device according to claim 1,
   wherein the second accommodation part is configured to be placed on a floor or a desk.

8. The light source device according to claim 1,
   wherein the second accommodation part is configured to be attached to a wall or a. ceiling.

9. The light source device according to claim 1, further comprising:
   an optical sheet covering the one surface and being accommodated in the first accommodation part; and
   a reflection sheet covering at least both surfaces of the optical plate member, excluding the one surface and a light entering region which is to receive light emitted from the light source, and being accommodated in the casing.

10. The light source device according to claim 1,
    wherein the second accommodation part includes a flat surface to be placed on or attached to the external part outside the light source device.

11. The light source device according to claim 1,
    wherein the bent plate has an arc shape forming an acute angle between the optical part and the optical support.

12. The light source device according to claim 1,
    wherein the bent plate has an arc shape forming an obtuse angle between the optical part and the optical support.

* * * * *